United States Patent
Luo et al.

(10) Patent No.: US 12,244,498 B2
(45) Date of Patent: Mar. 4, 2025

(54) DATA TRANSMISSION CIRCUIT AND METHOD, CORE, CHIP, ELECTRONIC DEVICE AND STORAGE MEDIUM

(71) Applicant: Stream Computing Inc., Beijing (CN)

(72) Inventors: Fei Luo, Beijing (CN); Weiwei Wang, Beijing (CN)

(73) Assignee: Stream Computing Inc., Beijing (CN)

( * ) Notice: Subject to any disclaimer, the term of this patent is extended or adjusted under 35 U.S.C. 154(b) by 547 days.

(21) Appl. No.: 17/587,778

(22) Filed: Jan. 28, 2022

(65) Prior Publication Data
US 2022/0150168 A1    May 12, 2022

Related U.S. Application Data

(63) Continuation of application No. PCT/CN2019/102374, filed on Aug. 24, 2019.

(51) Int. Cl.
*H04L 45/745* (2022.01)
*H04L 49/00* (2022.01)
*H04L 69/22* (2022.01)

(52) U.S. Cl.
CPC ........ *H04L 45/745* (2013.01); *H04L 49/3063* (2013.01); *H04L 69/22* (2013.01); *H04L 2212/00* (2013.01)

(58) Field of Classification Search
CPC ... H04L 45/745; H04L 49/3063; H04L 69/22; H04L 2212/00; H04L 49/10; G06F 15/17318; G06F 15/173
See application file for complete search history.

(56) References Cited

U.S. PATENT DOCUMENTS

2006/0153183 A1* 7/2006 Lim ...................... H04L 49/351
                                                          370/389
2010/0325388 A1   12/2010 Howard
(Continued)

FOREIGN PATENT DOCUMENTS

CN         101957808 A        1/2011
CN         101996087 A        3/2011
(Continued)

OTHER PUBLICATIONS

International Search Report for PCT Application No. PCT/CN2019/102374, mailed May 26, 2020.
(Continued)

*Primary Examiner* — Sun Jong Kim
(74) *Attorney, Agent, or Firm* — Andrus Intellectual Property Law, LLP

(57) ABSTRACT

A data transmission circuit and method, a core, a chip with a multi-core structure, an electronic device and a storage medium are provided. The data transmission circuit includes a receiver, a controller, a lookup table circuit and a selector. The receiver is configured to receive an original data packet from Fabric; the controller is configured to determine whether the original data packet needs to be relayed according to an original control bit, and control a first input terminal of the selector to be enabled in response to that the original data packet needs to be relayed; the selector is configured to send a new data packet to the Fabric via the first input terminal, wherein the new data packet includes the original data and a new header acquired by the lookup table circuit according to an original index. In this way, power consumption of the data transmission circuit is reduced.

18 Claims, 5 Drawing Sheets

(56) References Cited

U.S. PATENT DOCUMENTS

| | | | |
|---|---|---|---|
| 2014/0219276 A1 | 8/2014 | Jokinen et al. | |
| 2016/0182509 A1 | 6/2016 | Kantecki et al. | |
| 2017/0353403 A1* | 12/2017 | Zemach | H04L 49/9042 |
| 2021/0266332 A1* | 8/2021 | Li | H04L 69/22 |

FOREIGN PATENT DOCUMENTS

| | | |
|---|---|---|
| CN | 102096654 A | 6/2011 |
| CN | 106254254 A | 12/2016 |

OTHER PUBLICATIONS

Extended European Search Report for European Patent Application No. EP19942732.9, dated May 30, 2022.

Keun Sup Shim et al., "Status Virtual Channel Allocation in Oblivious Routing," Networks-On-Chip, May 10, 2009, pp. 38-43.

Jiayi Sheng et al., "Collective Communication on FPGA Clusters with Status Scheduling," ACM Sigarch Computer Architecture News, Jan. 11, 2017, pp. 2-7.

Boyapati Rahul et al., "Fly-Over: A Light-Weight Distributed Power-Gating Mechanism for Energy-Efficient Networks-on-Chip," 2017 IEEE International Parallel and Distributed Processing Symposium, May 29, 2017, pp. 708-717.

Rani Khushboo et al., "Non-blocking Gated Buffers for Energy Efficient on-chip Interconnects in the Era of Dark Silicon," 2018 8th International Symposium on Embedded Computing and System Design (ISED), Dec. 13, 2018, pp. 74-79.

Wang Peng et al., "A Dynamic Bypass Approach to Realize Power Efficient Network-on-Chip," 2019 IEEE 21st International Conference on High Performance Computing and Communications, Aug. 10, 2019, pp. 2019-2026.

* cited by examiner

DATA TRANSMISSION CIRCUIT AND METHOD, CORE, CHIP, ELECTRONIC DEVICE AND STORAGE MEDIUM

CROSS-REFERENCE TO RELATED APPLICATION

This application is a continuation application of International Patent Application No. PCT/CN2019/102374, filed on Aug. 24, 2019, the entire contents of which are incorporated herein by reference for all purposes.

TECHNICAL FIELD

The present disclosure relates to the field of data transmission technologies, and more particularly to a data transmission circuit, a processing core, a chip with a multi-core structure, a data transmission method, an electronic device and a computer-readable storage medium.

BACKGROUND

With the development of science and technology, human society is rapidly entering an era of intelligence. The important feature of the era of intelligence is that people may acquire more and more types of data, the amount of data that people may acquire is becoming larger and larger, and the demand for the data processing speed is becoming higher and higher.

Chips are the cornerstone of data processing, which essentially determine the ability to process data. From a perspective of application fields, the chips are mainly developed in two routes. One is general-purpose chips, for example, central processing units (CPU) and the like, which can provide great flexibility but have low effective computing power when processing algorithms in a specific field; the other is special-purpose chips, for example, tensor processing units (TPU) and the like, which have high effective computing power in certain specific fields but are poor in processing capacity or even have no processing capacity in flexible and universal fields.

Due to various data types and numerous data volumes in the era of intelligence, the chips are required to not only process changing algorithms in different fields with extremely high flexibility, but also rapidly process a great number of dramatically increasing data volumes with extremely strong processing capacities.

In chips with multi-core structures, one or more tasks may be completed across cores through cooperation. When the tasks are completed through cooperation, it is often required to transmit data or control information between cores. Thus, data transmission between cores becomes crucially important, and even becomes a critical factor affecting multi-core computing power. In application, it is often required to send data of certain cores to a plurality of other cores.

FIG. 1 is a data transmission flowchart of broadcast data in a first existing technology. When a core $C_i$ (referred to as a source core) needs to send a data packet to a plurality of cores (referred to as target cores), such as a core $C_m$ and a core $C_n$, the data packet is broadcast through the following specific transmission process.

1. The core $C_i$ sends the data packet to a data exchange apparatus Fabric.
2. The Fabric transmits the data packet to all other cores connected thereto.
3. All other cores receive the data packet.

4. Each of the other cores checks the data packet, and determines whether the data packet is aimed at the present core; if yes, for example, the core $C_m$ and the core $C_n$ retain the data packet and store the data packet in their memories Mem; if not, for example, a core $C_j$ discards the data packet and does not store the data packet in its memory Mem.

In the data transmission manner of the first existing technology, the source core sends (broadcasts) the data to all other cores, which is equivalent to traverse paths to all other cores, thereby increasing power consumption, occupying the Fabric, and resulting in data blocking. Particularly, when a plurality of cores all send data to a plurality of other cores, serial processing is generated, thereby greatly reducing the utilization rate of the Fabric. Further, since each core receives the data, cores for which the data is unnecessary and invalid are required to process the data, thereby increasing burdens and the power consumption of circuits.

To alleviate the above problems in the first existing technology, a second existing technology as shown in FIG. 2 is provided. FIG. 2 is a data transmission flowchart of storing and relaying multi-cast data in the second existing technology. When the core $C_i$ needs to send the data packet to a plurality of cores, such as the core $C_m$ and the core $C_n$, the core $C_i$ firstly sends the data packet to the core $C_m$, and the core $C_m$ receives the data packet and stores the data packet in a local storage region Mem, and then reads out the data packet from the local storage region Mem and relays the data packet to the core $C_n$ through the following specific transmission process.

1. The core $C_i$ sends the data packet to the data exchange apparatus Fabric.
2. The Fabric transmits the data packet to the core $C_m$.
3. The core $C_m$ receives the data packet and stores the data packet in the local storage region Mem, and then checks whether the data packet needs to be sent to other cores; if yes, for example, the data packet needs to be sent to the core $C_n$, then the core $C_m$ reads out the data packet from the local storage region, resets a destination address as an address of the core $C_n$, and sends the data packet to the Fabric.
4. The core $C_n$ receives and stores the data packet, and performs the same process as step 3; if the data packet needs not to be sent to other cores, data transmission is ended.

In the data transmission manner of the second existing technology, an intermediate relay core needs to firstly write the data packet in a local storage region Mem after receiving the data packet, and then reads the data packet out of the local storage region Mem, thereby occupying the local storage region, affecting access to the local storage region by the core's own program, and reducing a utilization rate of the local storage region with large power consumption and long delay. At the same time, each core cannot repack and send data without participation of a dedicated control unit circuit, so that the process is complex.

SUMMARY

The present disclosure provides a data transmission circuit, a processing core, a chip with a multi-core structure, a data transmission method, an electronic device and a computer-readable storage medium.

According to a first aspect of the present disclosure, there is provided a data transmission circuit. The data transmission circuit includes a receiver, a controller, a lookup table circuit and a selector, wherein an input terminal of the receiver is configured to connect to an output terminal of a data exchange apparatus Fabric, and an output terminal of the receiver is connected to an input terminal of the controller, an input terminal of the lookup table circuit and a first input terminal of the selector respectively;

a control terminal of the controller is connected to a control terminal of the lookup table circuit and a control terminal of the selector respectively;

an output terminal of the lookup table circuit is connected to the first input terminal of the selector;

the receiver is configured to receive an original data packet from the Fabric, send an original control bit of a header of the original data packet to the controller, and send an original index of the header of the original data packet to the lookup table circuit;

the controller is configured to determine whether the original data packet needs to be relayed based on the original control bit; and in response to that the original data packet needs to be relayed, the controller controls the first input terminal of the selector to be enabled; and the selector sends a new data packet to the Fabric via the first input terminal, wherein the new data packet includes original data and a new header acquired by the lookup table circuit based on the original index.

In the data transmission circuit of the embodiment, storage of each data packet in the storage unit in the core and relay transmission of each data packet are performed in parallel rather than firstly writing the data packet in and then reading the data packet out. Thus, power consumption of the data transmission circuit may be reduced. Further, time for a subsequent data receiver to wait for data may be greatly reduced since storage and relay are performed in parallel. In addition, parameters required in the entire data transmission process are contained in the header of the sent data packet and are analyzed by a local circuit, so that a micro-controller is not occupied.

Optionally, sending by the selector the new data packet to the Fabric via the first input terminal includes:

the lookup table circuit acquires the new header based on the original index and sends the new header to the selector; and the selector sends the new data packet to the Fabric via the first input terminal.

Optionally, the data transmission circuit further includes a splicer;

an input terminal of the splicer is connected to the output terminal of the lookup table circuit and the output terminal of the receiver respectively, an output terminal of the splicer is connected to the first input terminal of the selector, and a control terminal of the splicer is connected to the control terminal of the controller, and sending by the selector the new data packet to the Fabric via the first input terminal includes:

the lookup table circuit acquires the new header based on the original index and sends the new header to the splicer;

the splicer forms the new data packet by packing the new header and the original data and sends the new data packet to the selector, and the selector sends the new data packet to the Fabric via the first input terminal.

Optionally, the selector further includes a second input terminal configured to connect to a storage;

in response to that the original data packet needs not to be relayed, the controller further controls the second input terminal of the selector to be enabled; and the selector sends local data that is stored in the storage as a second data packet to the Fabric via the second input terminal.

Optionally, the selector includes a selecting sub-circuit and a sending sub-circuit;

an input terminal of the sending sub-circuit is connected to an output terminal of the selecting sub-circuit;

an output terminal of the sending sub-circuit is connected to the Fabric; and the sending sub-circuit is configured to send the data packet output by the selecting sub-circuit to the Fabric.

Optionally, the sending sub-circuit includes a sub-controller and a level setting sub-circuit connected to the sub-controller; wherein the level setting sub-circuit is configured to set sending levels of the new data packet and the second data packet; and the sub-controller is configured to send the new data packet and the second data packet according to the sending levels.

In the data transmission circuit of the embodiment, level setting is performed on data sent by the sending sub-circuit to effectively ensure that important data is transmitted with priority, thereby effectively ensuring the efficiency of data transmission.

Optionally, the selecting sub-circuit includes a first selection transistor and a second selection transistor, wherein a control electrode of the first selection transistor is connected to the control terminal of the controller, a first electrode of the first selection transistor is connected to the output terminal of the splicer, and a second electrode of the first selection transistor is connected to the input terminal of the sending sub-circuit;

a control electrode of the second selection transistor is connected to the control terminal of the controller, a first electrode of the second selection transistor is connected to the output terminal of the storage, and a second electrode of the second selection transistor is connected to the input terminal of the sending sub-circuit; and one of the first selection transistor and the second selection transistor is an N-type transistor, and the other is a P-type transistor.

Optionally, the sending levels are set so that the sending level of the new data packet is higher than the sending level of the second data packet; or the sending levels are set so that the new data packet and the second data packet are sent alternately.

Optionally, in response to that the original data packet needs not to be relayed, the lookup table circuit and/or the splicer are shut off.

In the data transmission circuit of the embodiment, in response to that the original data packet needs not to be relayed, the lookup table circuit and/or the splicer are shut off, so that the power consumption of the transmission circuit may be effectively saved.

Optionally, the lookup table circuit includes a lookup sub-circuit and a sub-storage connected to the lookup sub-circuit; wherein the sub-storage is configured to pre-store a lookup table, the lookup table including a plurality of items, and each item corresponding to a unique original index and including a new header;

and acquiring by the lookup table circuit the new header based on the original index includes:

the lookup sub-circuit looks up an item that corresponds to the original index from the lookup table as the new header and output the new header.

Optionally, the controller includes a determining sub-circuit and a transmitting sub-circuit; wherein the determining sub-circuit is configured to determine whether the original data packet needs to be relayed according to a value of the original control bit; if yes, an output value of the determining sub-circuit is set to 1; if not, the output value of the determining sub-circuit is set to 0; and the transmitting sub-circuit is configured to transmit the output value of the determining sub-circuit to the lookup table circuit and the selector respectively; or the transmitting sub-circuit is configured to transmit the output value of the determining sub-circuit to the lookup table circuit, the selector and the splicer respectively.

Optionally, the data transmission circuit further includes a changing circuit connected to the receiver; wherein the receiver is further configured to receive a change request carrying a new control bit and a new index; and the changing circuit is configured to change the header of the original data packet received by the receiver based on the change request.

Optionally, the data transmission circuit further includes:

the output terminal of the receiver is configured to connect to the storage, and send the original data in the original data packet to the storage.

Optionally, the output terminal of the receiver is connected to the first input terminal of the selector via the splicer, and the output terminal of the lookup table circuit is connected to the first input terminal of the selector via the splicer.

According to a second aspect of the present disclosure, there is provided a processing core. The processing core includes a storage and a data transmission circuit. The data transmission circuit is the foregoing data transmission circuit; wherein the output terminal of the receiver is connected to an input terminal of the storage, and the second input terminal of the selector is connected to an output terminal of the storage.

According to a third aspect of the present disclosure, there is provided a chip with a multi-core structure. The chip with the multi-core structure includes a plurality of processing cores and Fabric connecting the processing cores with each other. At least one of the processing cores includes the foregoing data transmission circuit, or at least one of the processing cores is the foregoing processing core.

According to a fourth aspect of the present disclosure, there is provided a data transmission method including the following specific steps:

receiving an original data packet in Fabric, wherein a header of the original data packet carries an original control bit and an original index;

determining whether the original data packet needs to be relayed based on the original control bit; and in response to that the original data packet needs to be relayed, sending a new data packet to the Fabric, wherein the new data packet includes original data and a new header acquired based on the original index.

Optionally, the step of sending the new data packet to the Fabric specifically includes:

acquiring the new header based on the original index; and sending the new data packet to the Fabric.

Optionally, the step of sending the new data packet to the Fabric specifically includes:

acquiring the new header based on the original index;

forming the new data packet by packing the new header and the original data; and sending the new data packet to the Fabric.

Optionally, the method further includes:

in response to that the original data packet needs not to be relayed, sending local data as a second data packet to the Fabric.

Optionally, the method further includes:

setting sending levels of the new data packet and the second data packet; and sending the new data packet and the second data packet according to the sending levels.

Optionally, the sending levels are set so that the sending level of the new data packet is higher than the sending level of the second data packet; or the sending levels are set so that the new data packet and the second data packet are sent alternately.

Optionally, the method further includes:

in response to that the original data packet needs not to be relayed, stopping table lookup and/or stopping splicing.

Optionally, the step of acquiring the new header based on the original index specifically includes:

looking up an item that corresponds to the original index from the lookup table as the new header and outputting the new header, wherein the lookup table includes a plurality of items, and each item corresponds to a unique original index and includes a new header.

Optionally, the step of determining whether the original data packet needs to be relayed based on the original control bit specifically includes:

determining whether the original data packet needs to be relayed according to a value of the original control bit; if yes, setting an output value to 1; if not, setting the output value to 0.

Optionally, the method further includes:

receiving a change request carrying a new control bit and a new index; and changing the received header of the original data packet based on the change request.

Optionally, the step of responding to that the original data packet needs to be relayed further includes:

sending the original data in the original data packet to a local storage.

According to a fifth aspect of the present disclosure, there is provided an electronic device, including:

one or more processors; and a storage configured to store one or more programs, wherein the one or more programs, upon execution by the one or more processors, cause the one or more processors to implement the foregoing data transmission method.

According to a sixth aspect of the present disclosure, there is provided a computer-readable storage medium storing a computer program, wherein the computer program, upon execution by a processor, causes the processor to implement the foregoing data transmission method.

In the data transmission circuit of the present disclosure, the storage of each data packet in the storage unit in the core and the relay transmission of each data packet are performed in parallel rather than firstly writing the data packet in and then reading the data packet out. Thus, the power consumption of the data transmission circuit may be reduced. Further, the time for the subsequent data receiver to wait for data may be greatly reduced since storage and relay are performed in parallel. In addition, parameters required in the entire data transmission process are contained in the header of the sent data packet and analyzed by the local circuit, so that the micro-controller is not occupied.

DETAILED DESCRIPTION

Figure 1:
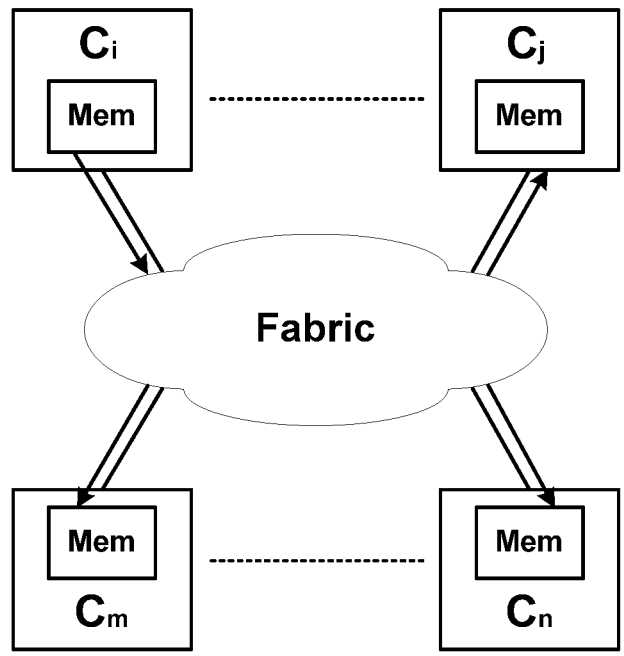
FIG. 1 is a data transmission flowchart of broadcast data in a first existing technology.
Figure 2:
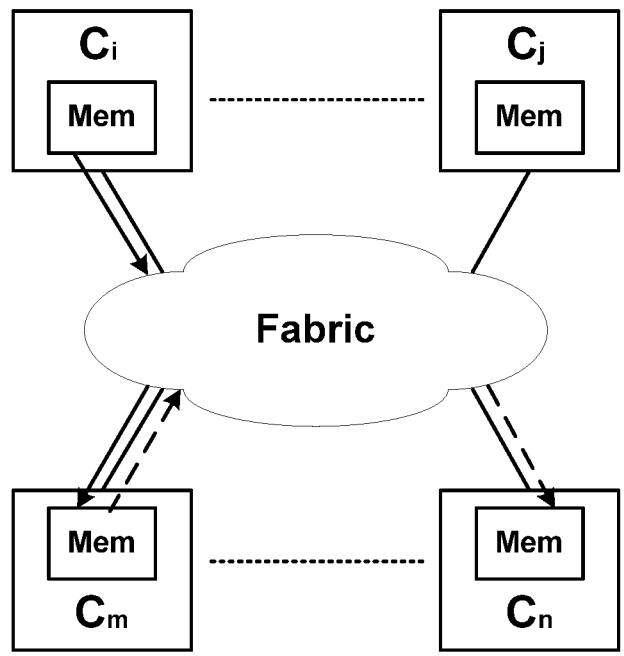
FIG. 2 is a data transmission flowchart of storing and relaying multi-cast data in a second existing technology.

To help those skilled in the art understand technical solutions of the present disclosure better, the present disclosure is further described in detail below in combination with accompanying drawings and specific embodiments. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in a different order, and/or in parallel. In addition, the method embodiments may include additional steps and/or omit the steps illustrated. The scope of the present disclosure is not limited in this regard.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments". Relevant definitions of other terms will be given in the descriptions below.

It should be noted that the concepts such as "first" and "second" mentioned in the present disclosure are used only to distinguish between different apparatuses, modules or units, and are not intended to define the order or mutual interdependence of the functions performed by these apparatuses, modules or units. The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. A unit or module may be implemented purely by software, purely by hardware, or by a combination of hardware and software. In a pure software implementation, for example, the unit or module may include functionally related code blocks or software components, that are directly or indirectly linked together, so as to perform a particular function. For example, a "receiving unit" may also be referred to as a "receiving circuit" or a "receiver".

It should be noted that the modifications of "one", "a" and "plurality of" referred to in the present disclosure are illustrative rather than limiting, and it should be understood by those skilled in the art to mean "one or more" unless the context clearly indicates otherwise.

The names of messages or information exchanged between the plurality of apparatuses in the embodiments of the present disclosure are used for illustrative purposes only and are not intended to limit the scope of the messages or information.

In multi-core or many-core chips, different cores on the chip are connected with each other via Fabric to transmit data, and each core includes a storage unit and a data transmission circuit. An embodiment of the present disclosure provides a data transmission circuit applied to the above multi-core or many-core chip.

Figure 3:
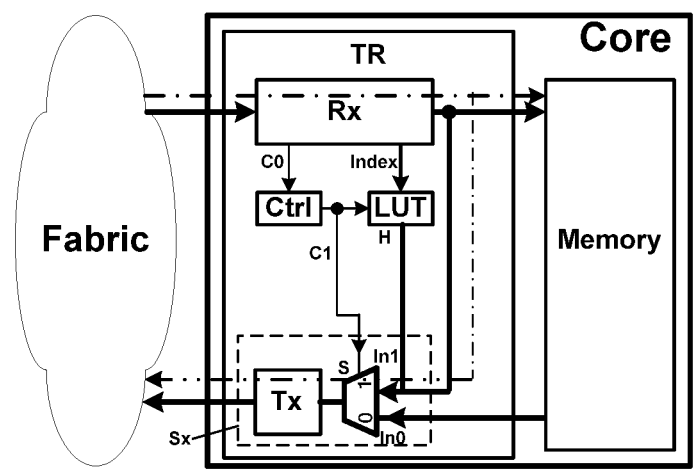
FIG. 3 is a structural schematic diagram of a data transmission circuit according to a first embodiment of the present disclosure.

As shown in FIG. 3, a first optional embodiment of the present disclosure relates to a data transmission circuit TR. The data transmission circuit TR includes a receiving unit Rx (i.e., receiver), a controlling unit Ctrl (i.e., controller), a lookup table unit LUT (i.e., lookup table circuit) and a selecting unit Sx (i.e. selector). An input terminal of the receiving unit Rx is for connecting to an output terminal of a data exchange apparatus Fabric, and an output terminal of the receiving unit Rx is connected to an input terminal of the controlling unit Ctrl, an input terminal of the lookup table unit LUT and a first input terminal In1 of the selecting unit Sx respectively; and the output terminal of the receiving unit Rx is also connected to an input terminal of a storage unit Memory (i.e., storage) in a core Core. A control terminal of the controlling unit Ctrl is connected to a control terminal of the lookup table unit LUT and a control terminal of the selecting unit Sx respectively, and an output terminal of the lookup table unit LUT is connected to the first input terminal In1 of the selecting unit Sx.

Specifically, the receiving unit Rx is configured to receive an original data packet from the Fabric and send original data in the original data packet to the selecting unit Sx, send an original control bit C0 of a header of the original data packet to the controlling unit Ctrl, and send an original index Index of the header of the original data packet to the lookup table unit LUT. The controlling unit Ctrl is configured to determine whether the original data packet needs to be relayed based on the original control bit C0; if yes, the controlling unit sends a relay control signal; if not, the controlling unit sends a non-relay control signal. In response to that the original data packet needs to be relayed, that is, in response to receiving the relay control signal, the controlling unit Ctrl is configured to control the first input terminal In1 of the selecting unit Sx to be enabled; in this way, the selecting unit Sx is configured to send a new data packet to the Fabric via the first input terminal In1. The new data packet includes the original data and a new header acquired by the lookup table unit LUT based on the original index, and the new header includes a new control bit, a new index and a target address.

Figure 4:
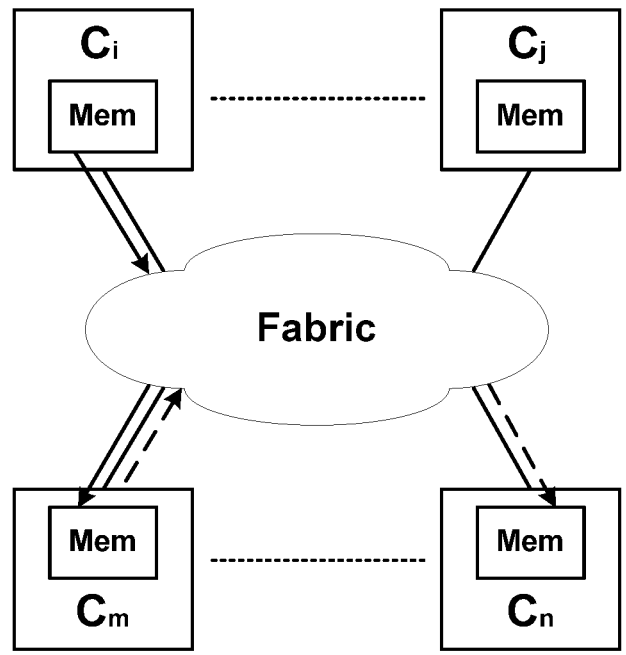
FIG. 4 is a flowchart of relay transmission of data according to a second embodiment of the present disclosure.

Referring to FIG. 3 and FIG. 4, for example, the core $C_i$ needs to send the original data packet to a plurality of cores, such as the core $C_m$ and the core $C_n$, wherein the core $C_m$ and the core $C_n$ are both provided with the data transmission circuit as shown in FIG. 3.

Specifically, the data transmission process between the core $C_i$ and the core $C_m$ is as follows.

The core $C_i$ firstly sends the original data packet to the Fabric, and the receiving unit Rx in the core $C_m$ receives the original data packet from the Fabric and sends a control bit in the original data packet to the controlling unit Ctrl and sends an index in the original data packet to the lookup table unit LUT. The controlling unit Ctrl checks the control bit C0 of the header of the original data packet, and outputs a value C1 when determining that the original data packet needs to be relayed; the lookup table unit LUT looks up a corresponding new header from the lookup table based on the original index Index of the header of the original data packet, that is, a new header corresponding to a next destination core $C_n$, wherein the new header includes a new control bit (that is, whether data transmitted to the core $C_n$ needs to be further relayed), a new index (that is, an index of a next destination to which the data transmitted to the core $C_n$ is further relayed) and a target address (the target address is the address of the core $C_n$). Then, the selecting unit Sx sends a new data packet composed of the new header and the original data to the Fabric via the first input terminal In1 of the selecting unit, and the Fabric sends the new data packet to the core $C_n$.

Further, the receiving unit Rx in the core $C_n$ receives the new data packet from the Fabric, the controlling unit Ctrl in the core $C_n$ checks the control bit in the header of the new data packet. When determining that the new data packet needs not to be relayed according to the control bit, the data in the new data packet is stored in a storage unit Memory of the core $C_n$, and the transmission of the new data packet is ended.

In the data transmission circuit of the embodiment, it is not required to firstly store the data packet in the storage unit in the core and then read the data packet out, thereby reducing the power consumption of the transmission circuit. In addition, the storage of each data packet in the storage unit Memory in the core and the relay transmission of each data packet are performed in parallel rather than firstly writing the data packet in and then reading the data packet out, thereby greatly reducing the time that the subsequent data receiver waits for the data. In addition, parameters required in the entire data transmission process are contained in the header of the sent data packet and analyzed by the local circuit, so that the micro-controlling unit is not occupied.

It should be noted that each unit structure of the data transmission circuit in the embodiment may be implemented in the form of a hardware circuit. For example, the receiving unit Rx may be of a receiver structure, the controlling unit Ctrl may be of a comparator structure that determines whether the data packet needs to be relayed according to the control bit, and the selecting unit Sx may be a selector that determines whether to output the corresponding data packet to the Fabric according to the control bit. Certainly, in addition to the above form of hardware, each unit structure of the transmission circuit in the embodiment may also be implemented in the form of software, as long as functions corresponding to each unit can be implemented.

Figure 5:
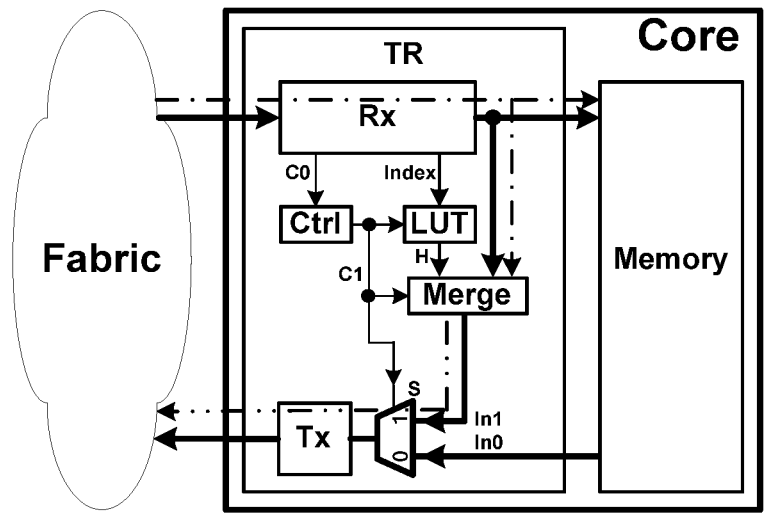
FIG. 5 is a structural schematic diagram of a data transmission circuit according to a third embodiment of the present disclosure.

The data transmission circuit TR according to a second optional embodiment of the present disclosure may further include a splicing unit Merge (i.e. splicer), as shown in FIG. 5.

An input terminal of the splicing unit Merge is connected to the output terminal of the lookup table unit LUT and the output terminal of the receiving unit Rx respectively, an output terminal of the splicing unit Merge is connected to the first input terminal In1 of the selecting unit Sx, and a control terminal of the splicing unit Merge is connected to the control terminal of the controlling unit Ctrl. The splicing unit Merge is configured to form a new data packet by packing the original data and the new header acquired by the lookup table unit LUT from the lookup table based on the original index, and send the new data packet to the selecting unit Sx.

It may be understood that, since the splicing unit Merge is added, the output terminal of the receiving unit Rx is connected to the first input terminal In1 of the selecting unit Sx via the splicing unit Merge; the output terminal of the lookup table unit LUT is connected to the first input terminal In1 of the selecting unit Sx via the splicing unit Merge.

It should be noted that a specific structure of the splicing unit Merge is not limited herein. For example, the splicing unit Merge may be a simple splicing circuit that splices pure data and the new header acquired from the lookup table unit LUT together.

It may be understood that the following relevant descriptions of the second optional embodiment are also applicable to the foregoing first optional embodiment without the splicing unit Merge, except that a position where the original data and the new header are packed is changed. In the first optional embodiment, packing and splicing are performed in the selecting unit Sx; and in the second optional embodiment, packing and splicing are performed in the splicing unit Merge. Those skilled in the art may understand that other descriptions are applicable to both optional embodiments.

As shown in FIG. 5, the selecting unit Sx further includes a second input terminal In0. The second input terminal In0 is connected to the output terminal of the storage unit Memory, reads from the storage unit Memory data in the core, i.e., a second data packet stored in the core, and sends the second data packet to the Fabric. The data in the core may be a packed data packet. At this time, in response to that the original data packet needs not to be relayed, the controlling unit Ctrl is further configured to control the second input terminal In0 of the selecting unit Sx to be enabled; in this way, the selecting unit Sx may directly send the second data packet to the Fabric.

Optionally, the controlling unit Ctrl may only connect the second input terminal and the storage unit when the second input terminal In0 of the selecting unit Sx is enabled. However, the selecting unit may choose not to output, and of course, it may also send signals such as an ending relay transmission signal.

Further, when the core in which the data transmission circuit is located is used as the source core (i.e., the data sending core), the controlling unit sends a control signal to the control terminal of the selecting unit, and controls the second input terminal of the selecting unit to be enabled; and further, the data stored in the storage unit is sent to the Fabric via the second input terminal of the selecting unit, and is sent to the target core by the Fabric.

It should be noted that a specific implementation structure in which the first input terminal In1 and the second input terminal In0 of the selecting unit Sx are connected to the output terminal of the splicing unit Merge and the output terminal of the storage unit Memory is not limited herein. Those skilled in the art may design a circuit structure satisfying such connection manner according to actual requirements.

As shown in FIG. 3 and FIG. 5, the selecting unit Sx includes a selecting sub-unit S (i.e., selecting sub-circuit) and a sending sub-unit Tx (i.e., sending sub-circuit); an input terminal of the sending sub-unit Tx is connected to an output terminal of the selecting sub-unit S; and an output terminal of the sending sub-unit Tx is connected to the Fabric. In this way, the sending sub-unit Tx may send the data packet output by the selecting sub-unit S to the Fabric.

Figure 6:
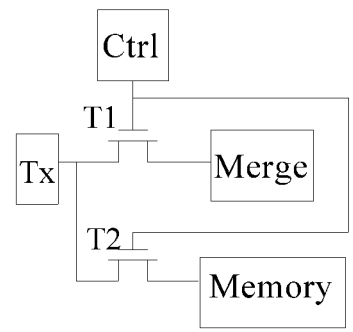
FIG. 6 is a structural schematic diagram of a selecting sub-unit in a data transmission circuit according to a fourth embodiment of the present disclosure.

Specifically, as shown in FIG. 6, the selecting sub-unit S includes a first selection transistor T1 and a second selection transistor T2. A control electrode of the first selection transistor T1 is connected to the control terminal of the controlling unit Ctrl, a first electrode of the first selection transistor T1 is connected to the output terminal of the splicing unit Merge, and a second electrode of the first selection transistor T1 is connected to the input terminal of the sending sub-unit Tx. A control electrode of the second selection transistor T2 is connected to the control terminal of the controlling unit Ctrl, a first electrode of the second selection transistor T2 is connected to the output terminal of the storage unit Memory, and a second electrode of the second selection transistor T2 is connected to the input terminal of the sending sub-unit Tx. Further, one of the first selection transistor T1 and the second selection transistor T2 is an N-type transistor, and the other is a P-type transistor.

It should be noted that, for the first selection transistor T1 and the second selection transistor T2, the control electrodes are gate electrodes, the first electrodes may be source electrodes, and the second electrodes may be drain electrodes; or the first electrodes may be drain electrodes, and the second electrodes may be source electrodes. In addition, when the first selection transistor T1 is the N-type transistor (which is turned on when the control electrode thereof receives a high-level signal), the second selection transistor is the P-type transistor (which is turned on when the control electrode thereof receives a low-level signal), and vice versa.

Figure 7:
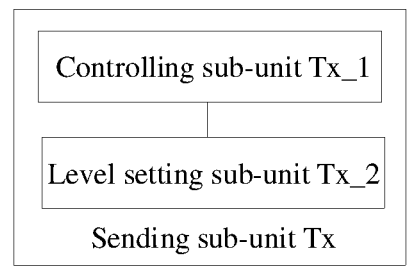
FIG. 7 is a structural schematic diagram of a sending sub-unit in a data transmission circuit according to a fifth embodiment of the present disclosure.

As shown in FIG. 7, the sending sub-unit Tx includes a controlling sub-unit Tx_1 (i.e., sub-controller) and a level setting sub-unit Tx_2 (i.e., level setting sub-circuit) connected to the controlling sub-unit Tx_1. The level setting sub-unit Tx_2 is configured to set sending levels of the new data packet and the data packet in the core (i.e., the second data packet). The controlling sub-unit Tx_1 is configured to send the new data packet and the data packet in the core according to the sending levels.

It should be noted that a specific rule for the sending level is not limited. For example, the new data packet may be processed with priority; or sending priority may be equally distributed, that is, the new data packet and the second data packet are sent alternately. The specific rule for the sending level may be determined according to actual requirements.

In the data transmission circuit of the embodiment, level setting is performed on the data sent by the sending sub-unit Tx to effectively ensure that important data is transmitted with priority, thereby effectively ensuring the data transmission efficiency.

Figure 8:
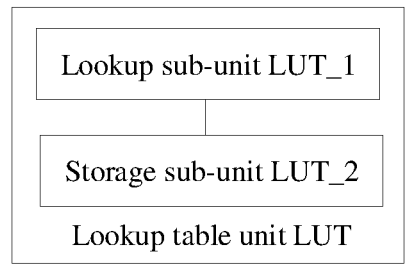
FIG. 8 is a structural schematic diagram of a lookup table unit in a data transmission circuit according to a sixth embodiment of the present disclosure.

As shown in FIG. 8, the lookup table unit LUT includes a lookup sub-unit LUT_1 (i.e., lookup sub-circuit) and a storage sub-unit LUT_2 (i.e., sub-storage) connected to the lookup sub-unit LUT_1. The storage sub-unit LUT_2 is configured to pre-store a lookup table. The lookup table includes a plurality of items, and each item corresponds to a unique original index and includes a new header. The lookup sub-unit LUT_1 is configured to lookup an item that corresponds to the original index from the lookup table as a new header based on the original index.

Specifically, for example, the storage sub-unit LUT_2 stores a plurality of items, and each item is a complete header, as shown in the following table.

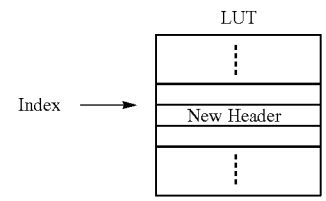

Index is an index that uniquely corresponds to an item in the LUT. The item to which the Index points is a new header NewHeader of the new data packet that will be spliced with the original data in the splicing unit Merge and sent out.

The content of the item in the LUT is also the content of the new header NewHeader as follows:

| C0 | Index | Addr_dest |
|---|---|---|

In the above table, C0 is a new control bit that determines whether the new data packet needs to be further relayed, Index is an index of the LUT, and Addr_dest is a destination address of the new data packet, which may be a target core address, or a target core address and a target storage address.

Preferably, to effectively save the power consumption of the transmission circuit, when receiving a non-relay signal, that is, in response to that the original data packet needs not to be relayed, the lookup table unit LUT and the splicing unit Merge are shut off. That is, a table lookup function and a merging and packing function are stopped. The shut-off of the lookup table unit LUT and the splicing unit Merge effectively saves the power consumption.

Figure 9:
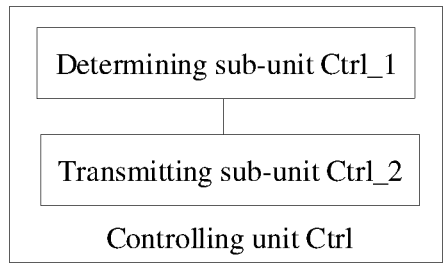
FIG. 9 is a structural schematic diagram of a controlling unit in a data transmission circuit according to a seventh embodiment of the present disclosure.

As shown in FIG. 5 and FIG. 9, the controlling unit Ctrl includes a determining sub-unit Ctrl_1 (i.e., determining sub-circuit) and a transmitting sub-unit Ctrl_2 (i.e., transmitting sub-circuit). The determining sub-unit Ctrl_1 is configured to determine whether the original data packet needs to be relayed according to a value of the original control bit; if yes, an output value C1 of the determining sub-unit Ctrl_1 is set to a first value, for example, 1; if not, the output value C1 of the determining sub-unit Ctrl_1 is set to a second value different from the first value, for example, 0. The transmitting sub-unit Ctrl_2 is configured to transmit the output value C1 of the determining sub-unit Ctrl_1 to the lookup table unit LUT and the splicing unit Merge respectively.

Figure 10:
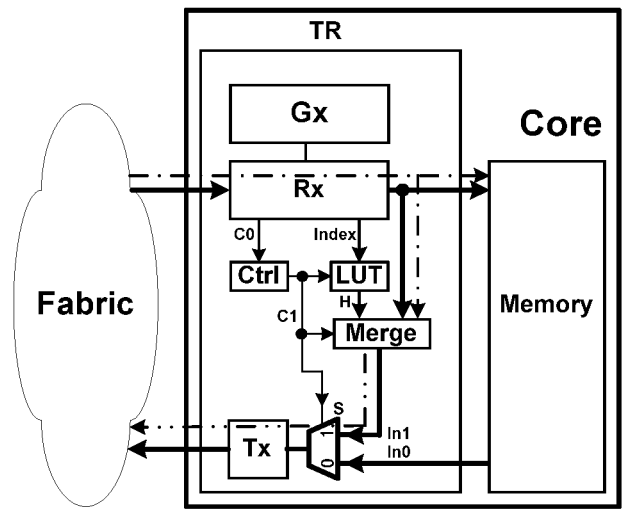
FIG. 10 is a structural schematic diagram of a data transmission circuit according to an eighth embodiment of the present disclosure.

As shown in FIG. 10, the data transmission circuit TR further includes a changing unit Gx (i.e., changing circuit) connected to the receiving unit Rx. The receiving unit Rx is further configured to receive a change request carrying a new control bit and a new index. The changing unit Gx is configured to change the header of the original data packet received by the receiving unit based on the change request.

For example, a local MCU or host may perform change according to different tasks, so as to transmit data in different task states.

As shown in FIG. 3 and FIG. 5, a third optional embodiment of the present disclosure provides a processing core Core including a storage unit Memory and a data transmission circuit. The data transmission circuit is the foregoing data transmission circuit TR with a specific structure for which reference may be made to the above relevant descriptions, which will not be repeated herein. The output terminal of the receiving unit Rx is connected to the input terminal of the storage unit Memory, and the second input terminal In0 of the selecting unit Sx is connected to the output terminal of the storage unit Memory.

The processing core of the embodiment has the foregoing data transmission circuit, and it is not required to firstly store the data packet in the storage unit in the core and then read the data packet out, thereby reducing the power consumption of the transmission circuit. In addition, the storage of each data packet in the storage unit Memory in the core and the relay transmission of each data packet are performed in parallel rather than firstly writing the data packet in and then reading the data packet out, thereby greatly reducing the time that the subsequent data receiver waits for the data. In addition, parameters required in the entire data transmission process are contained in the header of the sent data packet and analyzed by the local circuit, so that the micro-controlling unit is not occupied.

A fourth optional embodiment of the present disclosure provides a chip with a multi-core structure. The chip with the multi-core structure includes a plurality of cores and Fabric connecting the processing cores with each other. At least one processing core includes the foregoing data transmission circuit with the specific structure for which reference may be made to the above relevant descriptions, which will not be repeated herein; or, at least one processing core is the foregoing processing core.

The chip with the multi-core structure of the embodiment has the foregoing data transmission circuit or processing core, and it is not required to firstly store the data packet in the storage unit in the core and then read the data packet out, thereby reducing the power consumption of the transmission circuit. In addition, the storage of each data packet in the storage unit Memory in the core and the relay transmission of each data packet are performed in parallel rather than firstly writing the data packet in and then reading the data packet out, thereby greatly reducing the time that the subsequent data receiver waits for the data. In addition, parameters required in the entire data transmission process are contained in the header of the sent data packet and analyzed by the local circuit, so that the micro-controlling unit is not occupied.

Figure 11:
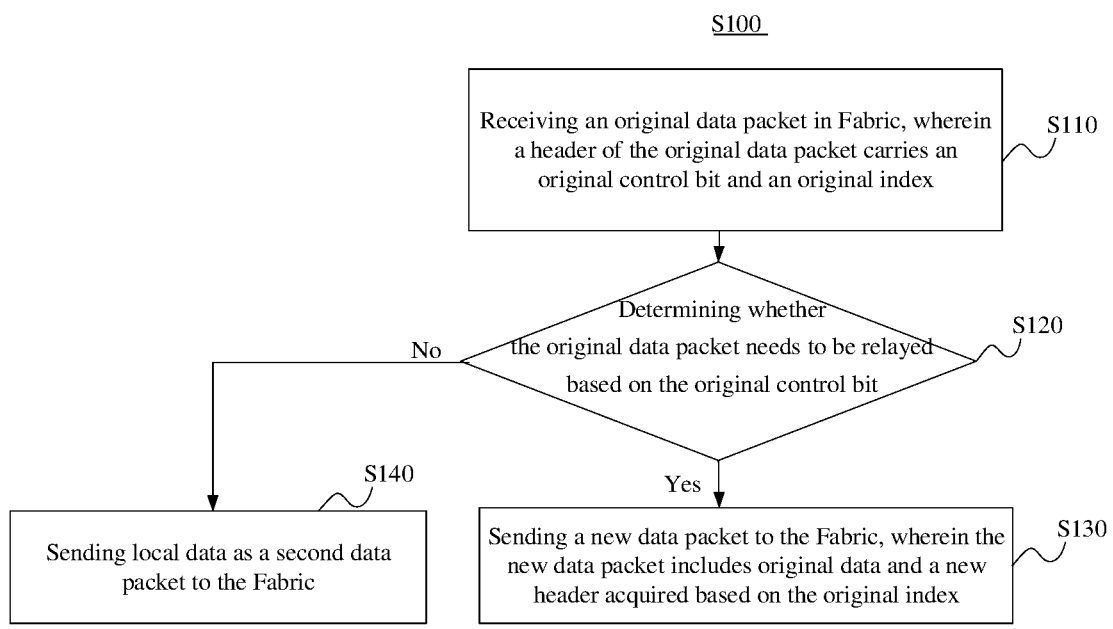
FIG. 11 is a flowchart of a data transmission method according to a ninth embodiment of the present disclosure.

As shown in FIG. 11, a fifth optional embodiment of the present disclosure provides a data transmission method S100. The data transmission method S100 may adopt the structure of the foregoing data transmission circuit, for which reference may be specifically made to the above relevant descriptions that will not be repeated herein. Specifically, the data transmission method S100 may include the following steps.

In S110, an original data packet in Fabric is received, wherein a header of the original data packet carries an original control bit and an original index.

In S120, whether the original data packet needs to be relayed is determined based on the original control bit.

In S130, in response to that the original data packet needs to be relayed, a new data packet is sent to the Fabric, wherein the new data packet includes original data and a new header acquired based on the original index.

In the data transmission method of the embodiment, it is not required to firstly store the data packet in the storage unit in the core and then read the data packet out, thereby reducing the power consumption of the transmission circuit. In addition, the storage of each data packet in the storage unit Memory in the core and the relay transmission of each data packet are performed in parallel rather than firstly writing the data packet in and then reading the data packet out, thereby greatly reducing the time that the subsequent data receiver waits for the data. In addition, parameters required in the entire data transmission process are contained in the header of the sent data packet and analyzed by the local circuit, so that the micro-controlling unit is not occupied.

Specifically, the step of sending the new data packet to the Fabric includes:
 acquiring a new header from a preset lookup table based on the original index, forming a new data packet by packing the new header and the original data, and then sending the new data packet to the Fabric.

Specifically, as shown in FIG. 11, the data transmission method S100 further includes the following step.

In S140, in response to that the original data packet needs not to be relayed, local data as a second data packet is sent to the Fabric.

To transmit the data efficiently, the data transmission method further includes the following step.

After sending levels of the new packet and the second data packet are set, the new packet and the second data packet are sent according to the sending levels. For example, the sending levels are set so that the sending level of the new data packet is higher than the sending level of the second data packet, or the new packet and the second data packet are sent alternately.

To reduce the power consumption, the data transmission method S100 further includes:
 in response to that the original data packet needs not to be relayed, stopping table lookup and/or splicing.
Optionally, step S120 specifically includes:
 determining whether the original data packet needs to be relayed according to a value of the original control bit; if yes, setting an output value to 1; if not, setting the output value to 0.
Optionally, the data transmission method further includes:
 receiving a change request carrying a new control bit and a new index; and
 changing the received header of the original data packet based on the change request.

A sixth optional embodiment of the present disclosure provides an electronic device, including:
 one or more processors; and
 a storage unit configured to store one or more programs, wherein the one or more programs, when executed by the one or more processors, cause the one or more processors to implement the foregoing data transmission method.

The electronic device of the embodiment stores the program in the storage unit thereof, and the program, when executed by the processor, causes the processor to implement the foregoing data transmission method. It is not required to firstly store the data packet in the storage unit in the core and then read the data packet out, thereby reducing the power consumption of the transmission circuit. In addition, the storage of each data packet in the storage unit Memory in the core and the relay transmission of each data packet are performed in parallel rather than firstly writing the data packet in and then reading the data packet out, thereby greatly reducing the time that the subsequent data receiver waits for the data. In addition, parameters required in the entire data transmission process are contained in the header of the sent data packet and analyzed by the local circuit, so that the micro-controlling unit is not occupied.

A seventh optional embodiment of the present disclosure provides a computer-readable storage medium storing a computer program. The computer program, when executed by a processor, causes the processor to implement the foregoing data transmission method, for which reference may be specifically made to the above relevant descriptions.

The computer-readable storage medium may be included in an apparatus, device and system of the present disclosure, or may be provided independently.

The computer-readable storage medium may be any tangible medium that contains or stores a program, and may be an electronic, magnetic, optical, electromagnetic, infrared or semi-conductor system, apparatus or device. More specific examples of the computer-readable storage medium include but not limited to, an electrical connection having one or more wires, a portable computer diskette, a hard disk, an optical fiber, a random-access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing.

The computer-readable storage medium may further include a data signal with a computer-readable program code embodied therein propagated in a baseband or as part of a carrier wave. Specific examples of the propagated data signal include but not limited to, electromagnetic signals, optical signals or any suitable combination of the foregoing.

It may be understood that the above embodiments are merely illustrative embodiments used for describing principles of the present disclosure but not intended to limit the present disclosure. Those of ordinary skill in the art may make various modifications and improvements without departing from the spirit and essence of the present disclosure, and these modifications and improvements shall also be encompassed in the scope of protection of the present disclosure.

The invention claimed is:

1. A data transmission circuit, comprising: a receiver; a controller; a lookup table circuit; and a selector circuit, wherein
an input terminal of the receiver is configured to be connected to an output terminal of a data exchange apparatus Fabric, and an output terminal of the receiver is connected to an input terminal of the controller, an input terminal of the lookup table circuit and a first input terminal of the selector circuit, respectively;
a control terminal of the controller is connected to a control terminal of the lookup table circuit and a control terminal of the selector circuit, respectively;
an output terminal of the lookup table circuit is connected to the first input terminal of the selector circuit;
the receiver is configured to receive an original data packet from the Fabric, send an original control bit of a header of the original data packet to the controller via the output terminal of the receiver and the input terminal of the controller, and send an original index of the header of the original data packet to the lookup table circuit via the output terminal of the receiver and the input terminal of the lookup table circuit;
the controller is configured to determine whether the original data packet needs to be relayed based on the original control bit;
in response to determining that the original data packet needs to be relayed based on the original control bit, the controller controls the first input terminal of the selector circuit to be enabled; and the selector circuit sends a new data packet to the Fabric via the first input terminal of the selector circuit, wherein the new data packet comprises original data of the original data packet and a new header, wherein the new header is acquired by the lookup table circuit based on the original index; and
in response to determining that the original data packet needs not to be relayed, the lookup table circuit is shut off.

2. The data transmission circuit according to claim 1, wherein sending, by the selector circuit, the new data packet to the Fabric via the first input terminal comprises:
the lookup table circuit acquires the new header based on the original index and sends the new header to the selector circuit; and
the selector circuit sends the new data packet to the Fabric via the first input terminal.

3. The data transmission circuit according to claim 1, further comprising a splicer circuit, wherein
an input terminal of the splicer circuit is connected to the output terminal of the lookup table circuit and the output terminal of the receiver, respectively, an output terminal of the splicer circuit is connected to the first input terminal of the selector circuit, and a control terminal of the splicer circuit is connected to the control terminal of the controller; and wherein
sending, by the selector circuit, the new data packet to the Fabric via the first input terminal comprises:
the lookup table circuit acquires the new header based on the original index and sends the new header to the splicer circuit;
the splicer circuit forms the new data packet by packing the new header and the original data and sends the new data packet to the selector circuit; and
the selector circuit sends the new data packet to the Fabric via the first input terminal.

4. The data transmission circuit according to claim 1, wherein the selector circuit further comprises a second input terminal configured to be connected to a storage;
in response to determining that the original data packet needs not to be relayed, the controller further controls the second input terminal of the selector circuit to be enabled; and
the selector circuit sends local data that is stored in the storage as a second data packet to the Fabric via the second input terminal.

5. The data transmission circuit according to claim 1, wherein the selector circuit comprises a selecting sub-circuit and a sending sub-circuit;
an input terminal of the sending sub-circuit is connected to an output terminal of the selecting sub-circuit;
an output terminal of the sending sub-circuit is connected to the Fabric; and
the sending sub-circuit is configured to send data packet output by the selecting sub-circuit to the Fabric.

6. The data transmission circuit according to claim 5, wherein the sending sub-circuit comprises a sub-controller and a level setting sub-circuit connected to the sub-controller;

the level setting sub-circuit is configured to set respective sending levels of the new data packet and a second data packet; and the sub-controller is configured to send the new data packet and the second data packet according to the sending levels.

7. The data transmission circuit according to claim 5, wherein the selecting sub-circuit comprises a first selection transistor and a second selection transistor; wherein
- a control electrode of the first selection transistor is connected to the control terminal of the controller, a first electrode of the first selection transistor is connected to an output terminal of a splicer circuit, and a second electrode of the first selection transistor is connected to the input terminal of the sending sub-circuit;
- a control electrode of the second selection transistor is connected to the control terminal of the controller, a first electrode of the second selection transistor is connected to an output terminal of a storage, and a second electrode of the second selection transistor is connected to the input terminal of the sending sub-circuit.

8. The data transmission circuit according to claim 7, wherein one of the first selection transistor and the second selection transistor is an N-type transistor, and the other of the first selection transistor and the second selection transistor is a P-type transistor.

9. The data transmission circuit according to claim 6, wherein the level setting sub-circuit is configured to set the sending level of the new data packet is higher than the sending level of the second data packet.

10. The data transmission circuit according to claim 6, wherein the level setting sub-circuit is configured to set the sending level of the new data packet and the sending level of the second data packet to be transmitted alternately.

11. The data transmission circuit according to claim 3, wherein:
in response to determining that the original data packet needs not to be relayed, the splicer circuit is shut off.

12. The data transmission circuit according to claim 1, wherein the lookup table circuit comprises a lookup sub-circuit and a sub-storage connected to the lookup sub-circuit;
the sub-storage is configured to pre-store a lookup table, the lookup table comprising a plurality of items and the new header, and each of the plurality of items corresponding to a corresponding one of a plurality of original indexes; and
acquiring, by the lookup table circuit, the new header based on the original index comprises:
the lookup sub-circuit looks up one of the plurality of items that corresponds to the original index of the plurality of original indexes from the lookup table as the new header and output the new header.

13. The data transmission circuit according to claim 1, wherein the controller comprises a determining sub-circuit and a transmitting sub-circuit;
the determining sub-circuit is configured to determine whether the original data packet needs to be relayed according to a value of the original control bit; and wherein
the determining sub-circuit is configured to determine that the original data packet needs to be relayed, an output value of the determining sub-circuit is set to 1;
the determining sub-circuit is configured to determine that the original data packet needs not to be relayed, the output value of the determining sub-circuit is set to 0; and
the transmitting sub-circuit is configured to transmit the output value of the determining sub-circuit to the lookup table circuit and the selector circuit, respectively.

14. The data transmission circuit according to claim 1, wherein a transmitting sub-circuit of the controller is configured to transmit an output value of a determining sub-circuit of the controller to the lookup table circuit, the selector circuit and a splicer circuit, respectively.

15. The data transmission circuit according to claim 1, further comprising a changing circuit connected to the receiver, wherein
the receiver is further configured to receive a change request carrying a new control bit and a new index; and
the changing circuit is configured to change the header of the original data packet received from the receiver based on the change request.

16. The data transmission circuit according to claim 5, wherein:
the output terminal of the receiver is configured to be connected to a storage, and send the original data in the original data packet to the storage.

17. A chip with a multi-core structure, comprising a plurality of processing cores and a data exchange apparatus Fabric connecting the processing cores with each other, wherein at least one of the processing cores comprises the data transmission circuit according to claim 1.

18. The chip with a multi-core structure according to claim 17, wherein: the at least one of the processing cores comprises a storage; wherein
the output terminal of the receiver is connected to an input terminal of the storage, and a second input terminal of the selector circuit is connected to an output terminal of the storage.

* * * * *